United States Patent Office 3,264,123
Patented August 2, 1966

3,264,123
FUSED CAST REFRACTORY
Allen M. Alper, Corning, and Robert N. McNally, Horseheads, N.Y., assignors to Corhart Refractories Company, Louisville, Ky., a corporation of Delaware
No Drawing. Filed June 7, 1962, Ser. No. 200,653
6 Claims. (Cl. 106—65)

This invention relates to the production of fused cast refractory shapes and articles of manufacture. In particular the invention relates to the production of sound, substantially crack-free cast shapes and articles made of an alumina-silica refractory composition characterized by high thermal shock resistance and a microstructure comprising a fine-grained, multiphase mixture of corundum crystals, mullite crystals and siliceous glass phase. As is well known, fused cast refractory is the type of refractory produced by melting a mass of refractory material of the desired composition, then casting and cooling the molten refractory material to form a solidified refractory mass.

It has been common experience in making castings from fused mixtures of alumina with about 2% to 20% or more of silica to find extensive cracking prevalent throughout the castings after being solidified and cooled. Even with conventional techniques of controlled slow cooling, cracking of the castings is found to be quite extensive. Heretofore, use was made of this cast material primarily in crushed granular form, e.g. as abrasive grains or grog material for bonded and sintered refractory bricks, and the cracking was found beneficial in making it relatively easier to crush the cast ingots into granular form.

However, the cracked castings were unsuitable for use as cast-shaped refractory articles because of their greatly weakened structural integrity which caused low physical strength and reduced resistance to corrosion and erosion, e.g. by penetration of molten glass into the cracks when the castings are used in glass melting tank linings. When the castings are subjected to even relatively light mechanical and/or thermal stresses, for example, during handling, shipping, or in service, or even during sawing of a billet into desired shapes, they tend to be so fragile that they readily break up, crumble or spall.

It is a primary object of this invention to eliminate or greatly minimize cracking during solidification and cooling of fused cast refractory articles made from a fusion comprising alumina with 1.5% to 25% $SiO_2$, by weight.

It is another object of this invention to provide sound, substantially crack-free, fused cast refractory articles comprising a fused mixture of alumina with 1.5% to 25% $SiO_2$, by weight, and characterized by a microstructure comprising a fine-grained, multi-phase mixture of corundum crystals, mullite crystals and siliceous glass phase, which structure provides a high degree of thermal shock resistance.

It is a further object of this invention to provide thermal shock resistant, fused cast refractory articles comprising a fused mixture of alumina with 1.5% to 25% $SiO_2$, by weight, and having an essentially multi-phase, fine grained structure comprising a mixture of corundum crystals, mullite crystals and siliceous glass phase, characterized by improved physical strength, i.e. modulus of rupture.

It is a still further object of this invention to provide a method of producing the foregoing sound, substantially crack-free, fused cast refractory articles having a high degree of thermal shock resistance and improved physical strength.

Other objects and advantages of the present invention will become apparent, to those skilled in the art, from the following detailed description.

We have discovered that the foregoing objects can be attained by incorporating fluorine in a molten refractory mass composed essentially of silica and alumina, wherein the quantities of fluorine, silica and alumina are proportioned to provide a melted refractory mixture consisting essentially of, analytically in weight percent, 0.05% to 2% fluorine, 1.5% to 25% $SiO_2$ and at least 92% total of fluorine plus $SiO_2$ plus $Al_2O_3$, thereafter casting and cooling the molten refractory to form a solidified refractory mass of desired shape and form. Cast refractory made in this manner is found to be free of cracks or, at most, contains very few, extremely small, discontinuous cracks which do not substantially lower the intrinsic physical strength of the cast refractory material. The microstructure of this cast material is essentially the same as that of the prior cast material not containing fluorine, i.e. an essentially multi-phase, fine grained structure comprising a mixture of corundum crystals, mullite crystals and siliceous glass phase in a random distribution with small pores or vugs generally located centrally in the casting. Occasionally there may occur minor amounts of small islands of what appears to be crystalline fluoride phase (composition of which is not certain) randomly dispersed in the microstructure.

It should be understood that the relative amounts of mullite and glass phase will vary with impurity content and rate of cooling of the cast refractory. When the impurity content is high as a result of using cheaper raw materials, as described below, generally larger amounts of glass phase will be present in the cast product. Hence, low impurity content will minimize the amount of glass phase and provide a greater mullite content relative to glass phase. Also, slower cooling rates will favor formation of mullite in preference to glass phase. Generally speaking, lower impurity contents and slower cooling rates will provide a cast product having a better refractory nature.

In carrying out our invention, we prefer to use relatively pure sources of alumina, silica and fluorine in order to obtain optimum properties in the cast product, especially resistance to hot load deformation and resistance to spalling due to thermal shock. In regard to the latter property, it is particularly important to keep iron oxides and titanium oxides as low as possible, the total quantity of both generally not to exceed 0.1%, or at most 0.2%, by weight of the total refractory composition. Other constituents, such as alkali metal oxides and alkaline earth metal oxides, should also be kept relatively low. Generally the total of alumina, silica and fluorine should amount to at least 96% by weight of the total refractory composition.

However, in some cases where somewhat lower thermal shock resistance and resistance to hot load deformation can be tolerated in the cast product, the total of alumina, silica and fluorine can be somewhat lower, but amounting to at least 92% by weight of the total refractory composition, with a correspondingly larger impurity content, including somewhat greater amounts of oxides of iron and titanium. In this case, cheaper and somewhat less pure raw materials can be used to make the substantially crack-free fused cast refractory articles according to this invention.

Commercial high purity grades of alumina and silica that have been found to be suitable as raw batch materials for optimum properties are a high purity Bayer process alumina and a high purity silica sand having the following typical analyses, in weight percent:

Alumina: Percent
$Al_2O_3$ _____ 99.2
$Na_2O$ _____ 0.45
$Fe_2O_3$ _____ 0.03
$SiO_2$ _____ 0.02
Other plus ignition loss _____ 0.3

Silica:
$SiO_2$ _____ 99.49
$Al_2O_3$ _____ 0.102
$Fe_2O_3$ _____ 0.039
$MgO$ _____ 0.021
$TiO_2$ _____ 0.015
Ignition loss _____ 0.19

Cheaper, less pure, commercially available raw materials that can be used are a relatively pure calcined bauxite and relatively pure silica-alumina clays having the following typical analyses, in weight percent:

| Bauxite, Percent | | Clay A, Percent | | Clay B, Percent | |
|---|---|---|---|---|---|
| $Al_2O_3$ | 90.6 | $SiO_2$ | 74.05 | $SiO_2$ | 75.34 |
| $SiO_2$ | 2.8 | $Al_2O_3$ | 18.93 | $Al_2O_3$ | 16.04 |
| $TiO_2$ | 4.0 | $Fe_2O_3$ | 0.43 | $TiO_2$ | 0.75 |
| $Fe_2O_3$ | 1.9 | $MgO$ | 0.38 | $Fe_2O_3$ | 0.54 |
| Ignition loss | 0.7 | $CaO$ | 0.44 | $MgO$ | 0.34 |
| | | Ignition loss | 5.77 | $CaO$ | Trace |
| | | | | $Na_2O+K_2O$ | 1.06 |
| | | | | Ignition loss | 5.57 |

As a source of fluorine, we prefer to use a relatively pure metal fluoride, although any suitable source may be employed as desired, including bubbling fluorine gas through a molten mass of alumina and silica. In using a metal fluoride, we prefer to mix it with the other refractory batch ingredients prior to melting; however, the fluoride may be added at any stage of the melting or pouring operations as desired, e.g. added to the molten refractory in the melting furnace just prior to pouring or placed in the mold prior to pouring.

Generally, the metal fluorides would be one of those having a boiling point of at least about 1200° C. because fluorides with too low a boiling point will excessively vaporize from the batch charge during the melting operation before they can fuse with the other ingredients. Thus, it has been determined, as a practical matter, that those metal fluorides with boiling points not substantially lower than 1200° C. will fuse into the molten pool formed during melting. Due to the low partial pressure of fluorine in the batch as a result of the lower concentration of the fluorine when distributed in the fused molten refractory and to the fact that equilibrium between the partial pressure of fluorine in the batch and above the bath does not occur in the relatively short fusion time before casting, a substantial amount of fluorine ( e.g. over 70%) is retained in the batch at the time of casting.

Examples of suitable metal fluorides and their respective boiling points are as follows:

Fluoride: B.P.—° C.
$AlF_3$ _____ 1260
$MgF_2$ _____ 2239
$CaF_2$ _____ 2500
$BaF_2$ _____ 2137
$SrF_2$ _____ 2460
$NaF$ _____ 1705

Mixtures or complex metal fluorides with sufficiently high boiling points can also be used, e.g. cryolite. A particular commercially available calcium fluoride material that has been found to be suitable as a raw batch source of fluorine is a fluorspar having the following typical analyses, in weight percent: 97.3% $CaF_2$, 1.2% $CaCO_3$, 1.1% $SiO_2$, 0.1% $Fe_2O_3$ and 0.3% ignition loss.

In the production of the fused cast refractory of the invention, the granular batch materials are proportioned in accordance with the desired composition for the refractory to be cast and are preferably premixed prior to charging into the melting furnace. Any of the well known melting furnaces can be used, such as the combustion gas type (i.e. utilizing the heat from combustion of a fluid carbonaceous fuel and air) or of the electric arc type. The latter type is preferred. The charge is then melted, cast into suitable preformed molds and annealed according to the known conventional techniques, for example, those disclosed in U.S. Patent 1,615,750 to G. S. Fulcher, to which reference may be had.

By way of illustration, four specific example castings of our novel fused cast refractory were made in accordance with this invention from the aforementioned Bayer process alumina, silica sand and fluorspar. These batch materials were appropriately proportioned, premixed prior to charging the furnace and electrically melted. The compositions and thermal shock resistance data for each are shown in Table I below. These castings were found to be substantially free of cracks and had relatively high physical strength, or modulus of rupture, in contrast with castings of similar composition, but in which fluorine was omitted.

*Table I*

| Melt No. | Batch Proportions in parts by weight | | Melted Mixture Composition in weight percent by analysis | | Thermal Shock Cycles |
|---|---|---|---|---|---|
| 1 | Silica sand | 2.0 | $SiO_2$ | 2.02 | 23 |
|   | Fluorspar | 0.7 | Fluorine | 0.25 | |
|   | Alumina | 97.3 | $Al_2O_3$ a | 97.73 | |
| 2 | Silica sand | 4.0 | $SiO_2$ | 4.01 | 14 |
|   | Fluorspar | 0.7 | Fluorine | 0.25 | |
|   | Alumina | 95.3 | $Al_2O_3$ a | 95.74 | |
| 3 | Silica sand | 8.0 | $SiO_2$ | 7.99 | 44 |
|   | Fluorspar | 0.7 | Fluorine | 0.25 | |
|   | Alumina | 91.3 | $Al_2O_3$ a | 91.76 | |
| 4 | Silica sand | 15.0 | $SiO_2$ | 14.96 | 25 |
|   | Fluorspar | 0.7 | Fluorine | 0.25 | |
|   | Alumina | 84.3 | $Al_2O_3$ a | 84.79 | | a By difference and includes a maximum of 1.5% total impurities with the total of iron oxides plus titanium oxides less than 0.05%.

The thermal shock data is based on a rigorous test which consists of introducing a 1" x 1" x 3" sample into a furnace heated to 1650° C., holding the sample in the heat for 10 minutes and then removing it to cool to room temperature. This constitutes one cycle and this procedure is repeated until a piece of the sample has spalled, at which point the number of cycles completed are noted.

Although the silica and fluorine contents of our novel refractory castings can broadly vary between the limits, respectively, of about 1.5% to 25% and 0.05% to 2%, analytically by weight, we prefer to keep them within the ranges, respectively, of 2% to 10% and 0.1% to 1%, analytically by weight, for optimum properties. Moreover, within the foregoing ranges, best results appear to be obtained by varying the fluorine content in approximately direct proportion to the silica content, i.e. the lower fluorine contents should be used with the lower silica contents and vice versa. In any event, the fluorine content should not exceed about 2% because excessive amounts, particularly when added in the form of metal fluorides, will adversely affect resistance to deformation under hot load stresses and will tend to form large oriented corundum crystals, which reduces the desirable thermal shock resistance characteristics of the cast products.

While the fused cast refractory articles of our invention are capable of many different applications, it is deemed particularly suitable for use as skid rails in high temperature metal annealing furnaces and for refractory linings in glass melting tanks.

Although the present invention has been described with reference to specific details of certain embodiments thereof, it is not intended that such details be limitations upon the scope of the invention except insofar as set forth in the following claims.

What is claimed is:

1. A fused cast refractory article composed of a fused mixture consisting essentially of, analytically in weight percent, 0.05% to 2% fluorine, 1.5% to 25% $SiO_2$ and at least 92% total of fluorine plus $SiO_2$ plus $Al_2O_3$.

2. The fused cast refractory article of claim 1 wherein the total quantity of fluorine, silica and alumina is at least 96% by weight of the whole refractory composition.

3. The fused cast refractory article of claim 2 wherein the total of iron oxides plus titanium oxides does not exceed 0.2% by weight.

4. A fused cast refractory article composed of a fused mixture consisting essentially of, analytically in weight percent, 0.1% to 1% fluorine, 2% to 10% $SiO_2$ and at least 96% total of fluorine plus $SiO_2$ plus $Al_2O_3$.

5. The fused cast refractory article of claim 4 wherein the total of iron oxides plus titanium oxides does not exceed 0.2% by weight.

6. A fused cast refractory article composed of a fused mixture consisting essentially of, analytically by weight, 0.05% to 2% fluorine, 1.5% to 25% $SiO_2$, the total of iron oxides plus titanium oxides not exceeding 0.1%, and the balance substantially all $Al_2O_3$.

References Cited by the Examiner
UNITED STATES PATENTS

| | | | |
|---|---|---|---|
| 2,195,950 | 4/1940 | Wood | 106—65 |
| 2,695,849 | 11/1954 | McMullen | 106—65 |

TOBIAS E. LEVOW, *Primary Examiner.*

J. POER, *Assistant Examiner.*